April 16, 1968 A. J. SYNCK 3,378,057
CORNICE FRAME
Filed Oct. 2, 1964 5 Sheets-Sheet 1
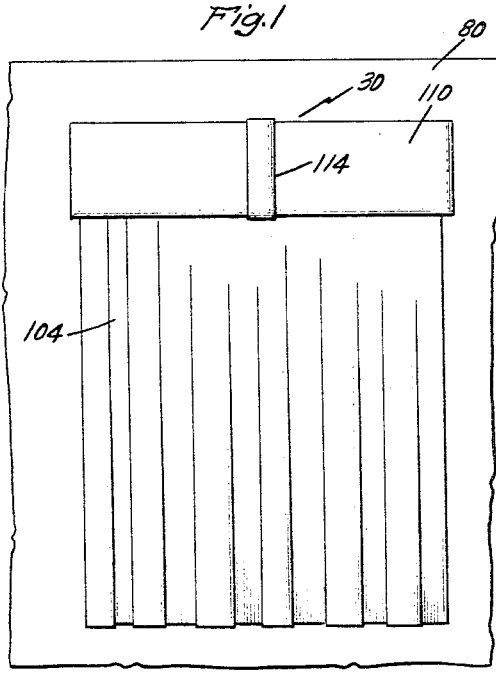
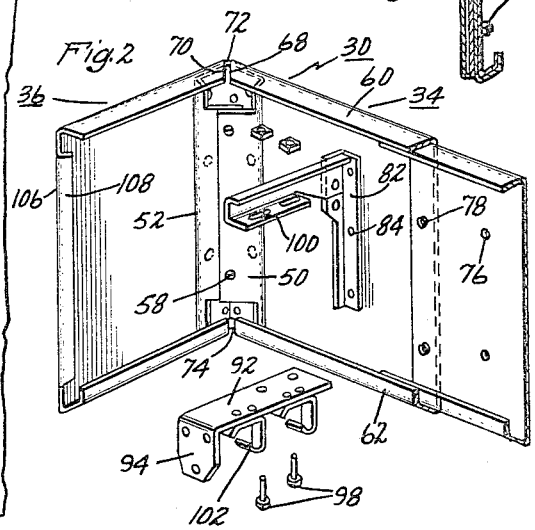
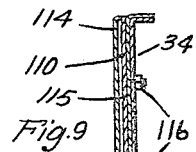
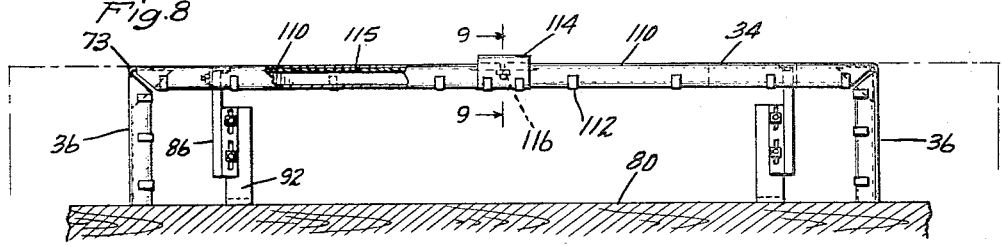
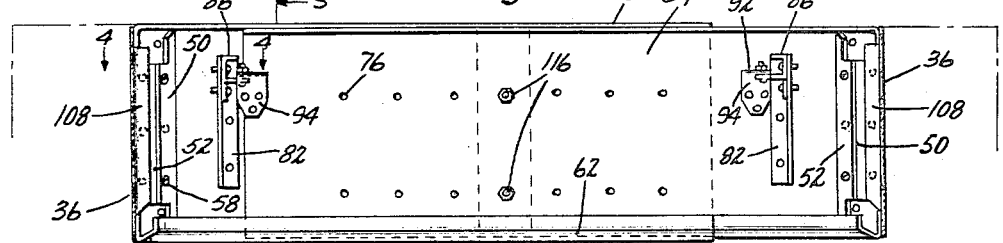
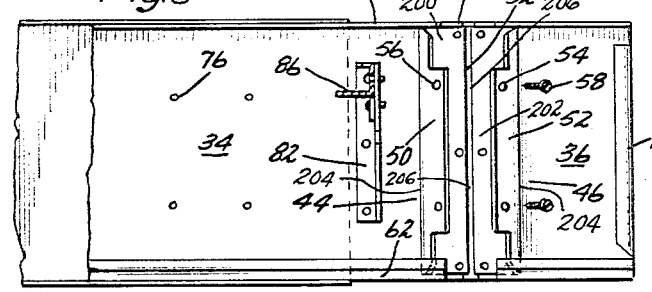
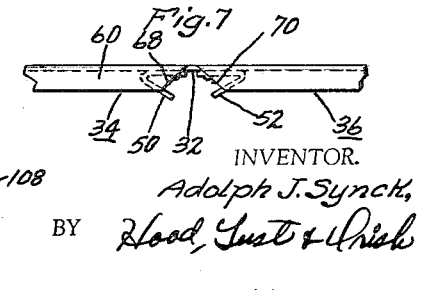
INVENTOR.
Adolph J. Synck,
BY Wood, Just & Uriah
Attorneys.

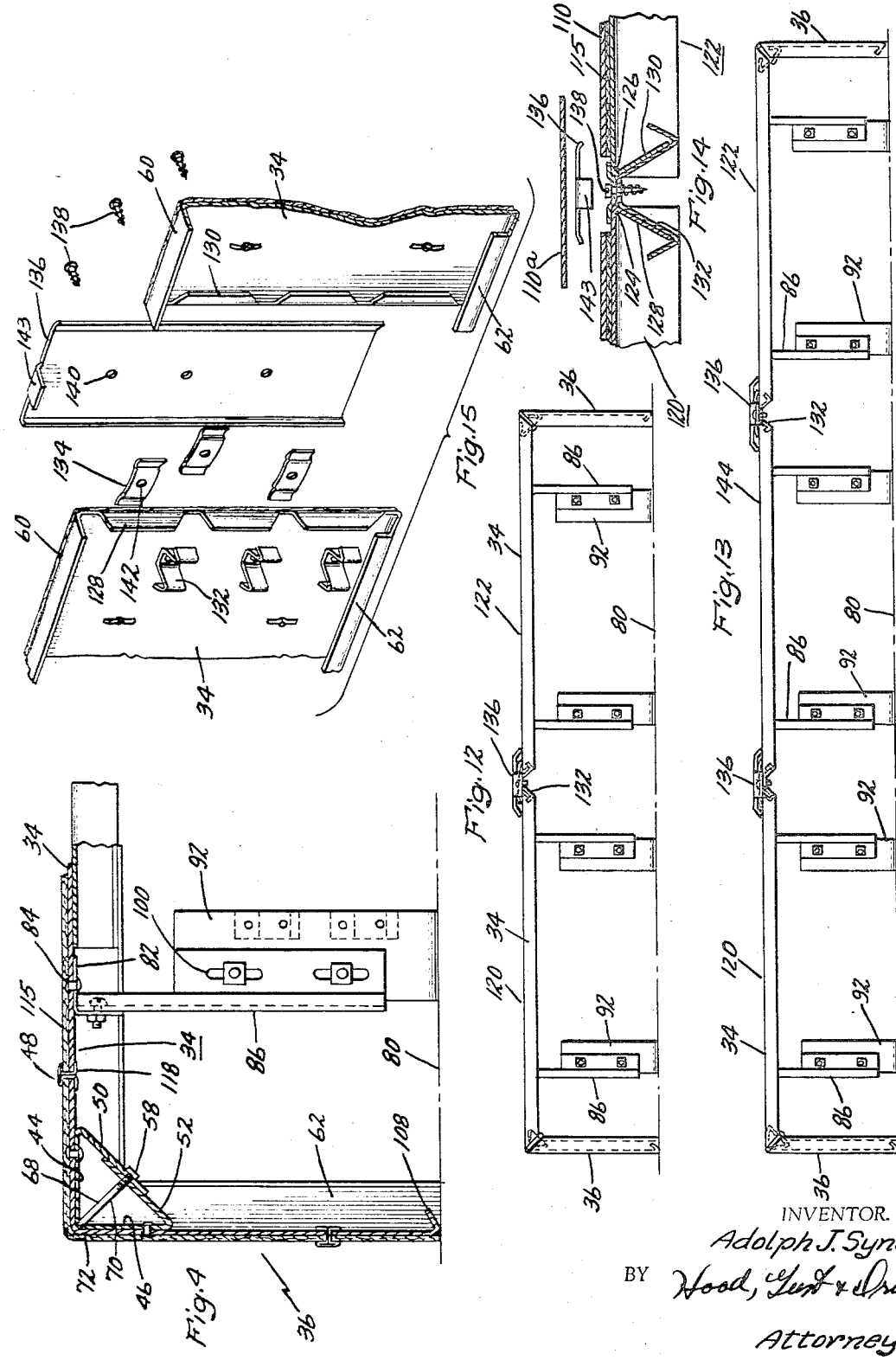

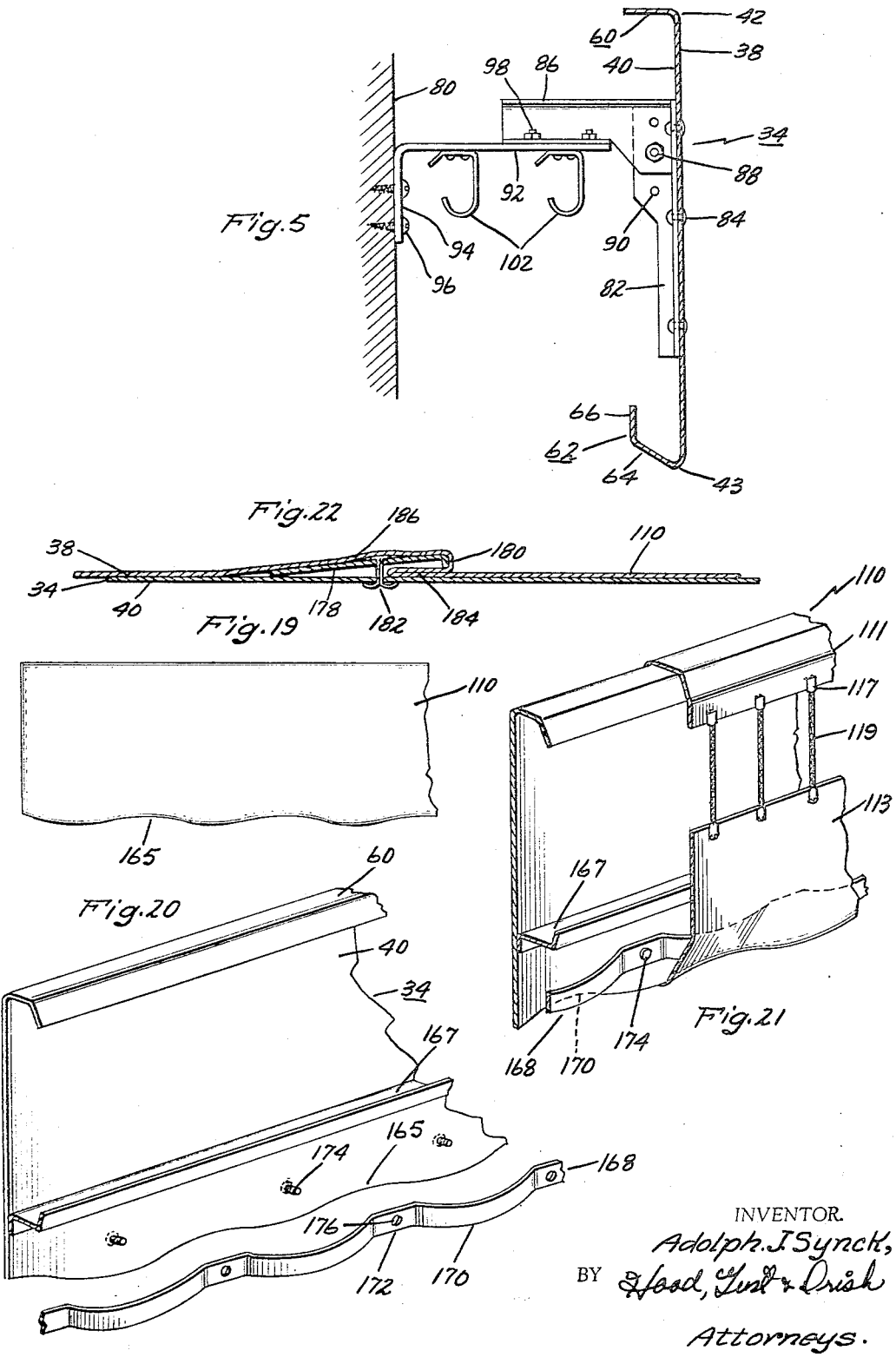

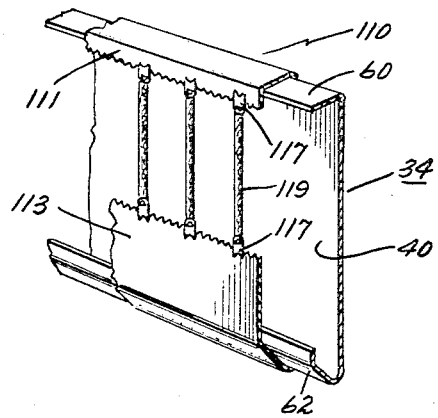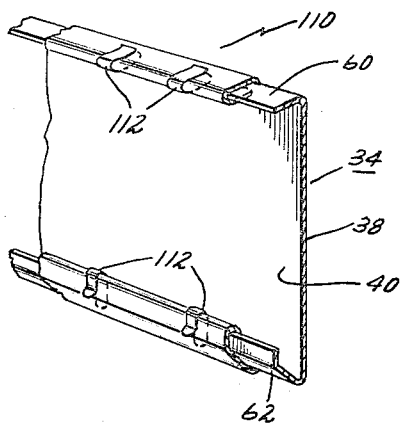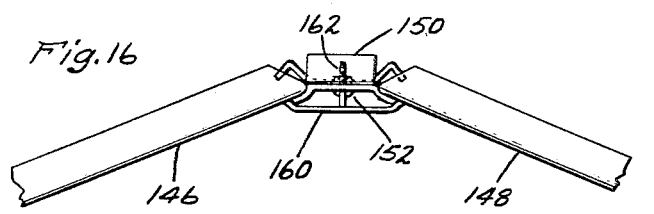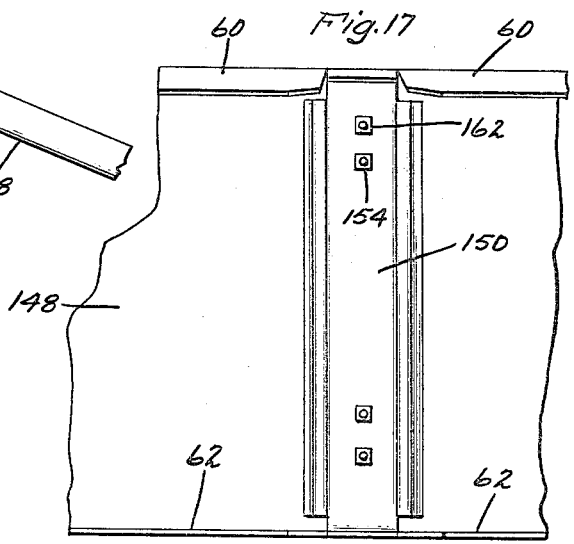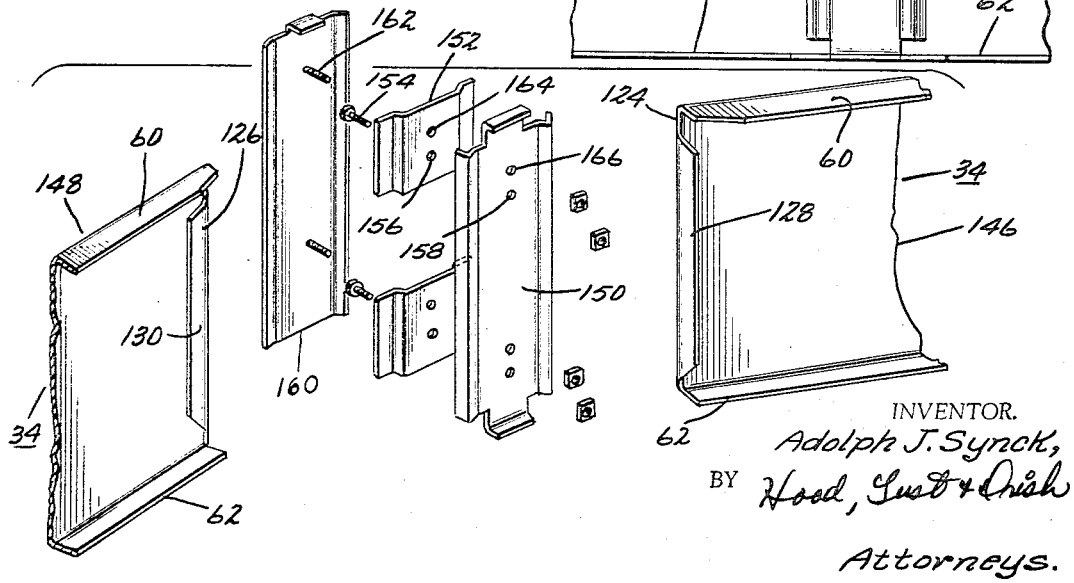

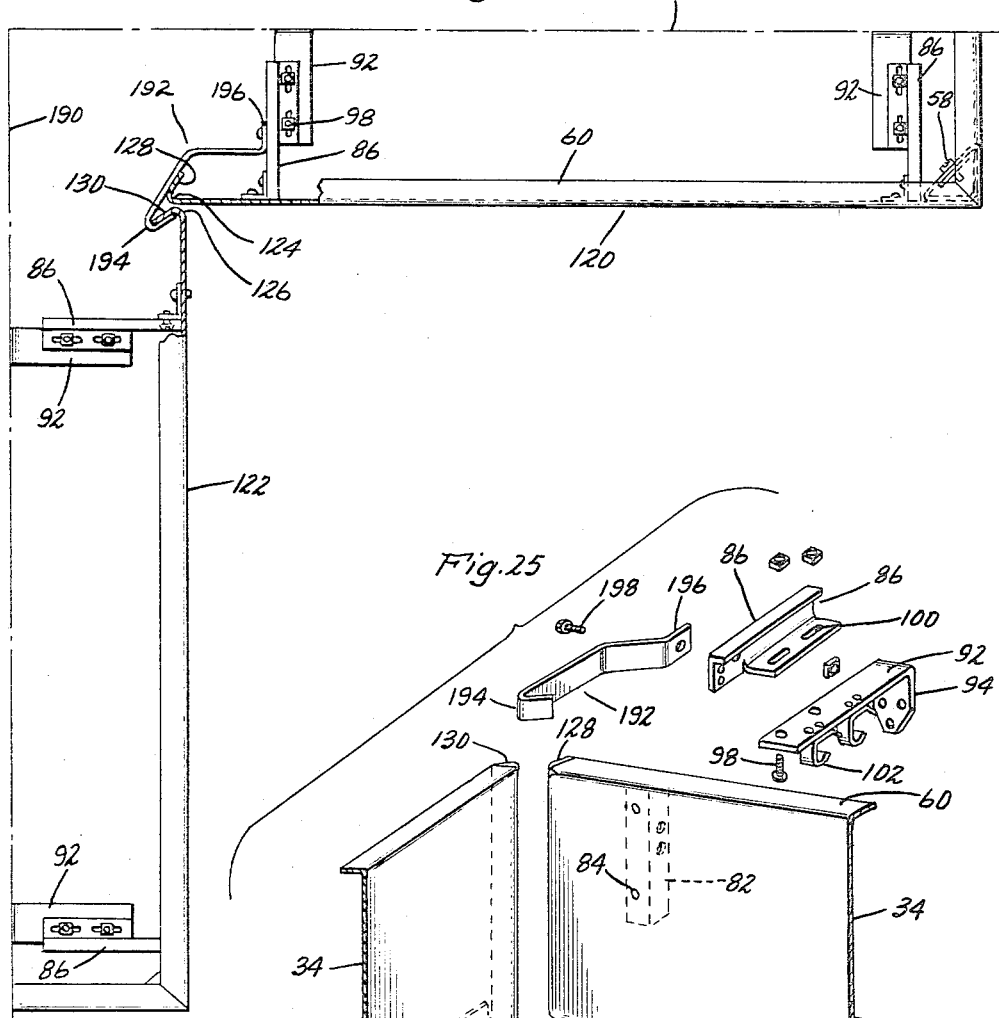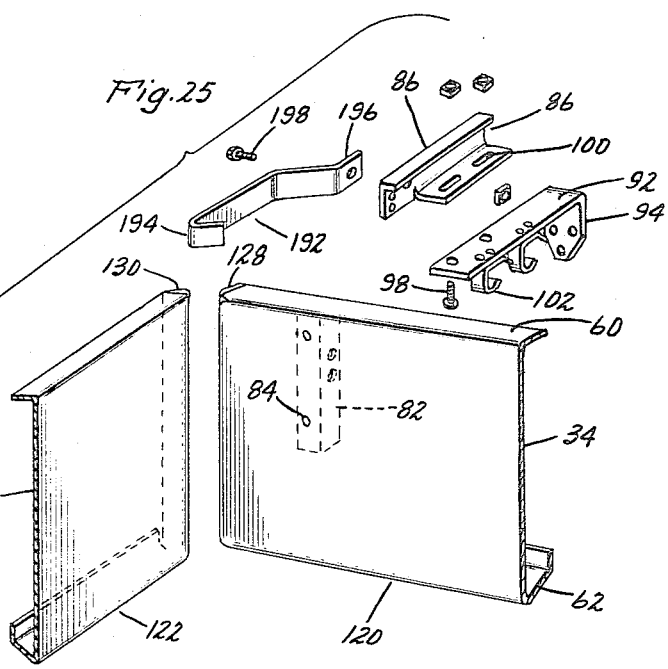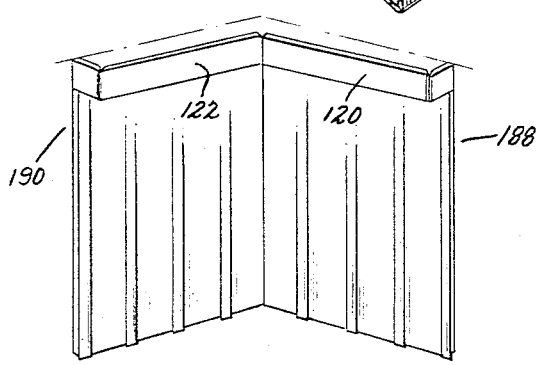

United States Patent Office 3,378,057
Patented Apr. 16, 1968

3,378,057
CORNICE FRAME
Adolph J. Synck, 717 W. Walnut St.,
Coldwater, Ohio 45828
Filed Oct. 2, 1964, Ser. No. 401,145
11 Claims. (Cl. 160—39)

This invention relates generally to cornice frames, and more particularly, to a prefabricated cornice frame construction.

Cornice frames are commonly employed in the interior decorating of homes and offices for concealing drapery rods and the upper extremities of draperies suspended therefrom. While prefabricated wooden cornice frames are commercially available, nailing and/or gluing has been required for their assembly, thus necessitating some degree of skill and mechanical aptitude. Such prefabricated wooden cornice frame assemblies, while available in a variety of fixed lengths, are usually not adjustable in length and thus may not fit any particular window. Furthermore, prefabricated wooden cornice frame assemblies have not been commercially available for larger "picture" windows, and other window configurations such as bay windows, corner windows, etc. Thus, most cornice frame assemblies, particularly for "picture" windows, bay windows, corner windows, etc. have been custom-fabricated of wood for a specific window at an appreciable expense.

In addition to the above-referred-to difficulties inherently involved in the use of commercially available prefabricated wooden cornice frame assemblies, and the cost of installation of custom-fabricated wooden cornice frame assemblies, once such a cornice frame has been installed, it is necessary to paint it or in the alternative to cover it with fabric matching or complementing the drapery fabric. Application of a fabric covering to such prior wooden cornice frame assemblies, whether of the prefabricated type or of the custom-installed type, has involved careful initial cutting of the material together with gluing, stapling, sewing or tacking the material to the cornice frame, and subsequent removal of the material either for replacement or cleaning has been equally difficult. As a result, the installation of attractive cornice assemblies on other than small conventional windows, has generally required professional services, i.e., carpenter, interior decorator, seamstress, etc., and the accompanying expense has inhibited more widespread use of cornice frames in interior decorating.

It is therefore desirable to provide a prefabricated, metal cornice frame assembly which is readily adjustable to windows of different widths, which can be knocked-down for shipment, which can be readily assembled and installed with minimum effort and skill, and which can be quickly and easily covered with fabric material which can thereafter be removed for cleaning or replacement with equal ease. It is further desirable that such a cornice frame construction be readily adaptable for installation on wide windows, corner windows, bay windows, and other types of installations, and that the construction lend itself to decorative variations and additions such as scalloped bottoms, multiple pleats, etc.

It is accordingly an object of the invention to provide a prefabricated cornice frame assembly.

Another object of the invention is to provide a prefabricated cornice frame construction which is readily adjustable for windows of different width, which is capable of shipment in knocked-down form, and which may readily be assembled and installed with minimum effort and skill.

A further object of the invention is to provide a prefabricated cornice frame assembly which may be readily covered with fabric, the fabric covering being capable of ready removal for replacement or cleaning.

A still further object of the invention is to provide a prefabricated cornice frame construction which is readily adaptable for installation on wide windows and other window configurations.

The above-mentioned and other features and objects of this invention and the manner of attaining them will become more apparent and the invention itself will be best understood by reference to the following description of an embodiment of the invention taken in conjunction with the accompanying drawings, wherein:

The cornice frame construction of the invention, in its broader aspects, comprises a unitary initially flat sheet of relatively thin self-supporting material divided along a transverse line into front and end panels, the sheet being adapted to be bent along the line so that the panels are disposed in angular relationship to define a corner, and means are provided for securing the panels in their angular relationship.

In the drawing:

FIG. 1 is a front end view of a completed installation of a basic cornice frame unit of the invention;

FIG. 2 is a fragmentary rear view in perspective, partly exploded, showing the cornice frame of the invention with the corner assembled;

FIG. 3 is a rear view of a basic cornice frame assembly incorporating the invention;

FIG. 4 is a cross-sectional view taken along the line 4—4 of FIG. 3;

FIG. 5 is a cross-sectional view taken along the line 5—5 of FIG. 3;

FIG. 6 is a fragmentary rear view showing the cornice frame construction of the invention as initially fabricated and shipped and before assembly of the corner;

FIG. 7 is a fragmentary top view of the cornice frame prior to assembly;

FIG. 8 is a top view partly broken away, showing one method of covering the cornice frame construction of the invention with fabric;

FIG. 9 is a cross-sectional view taken along the line 9—9 of FIG. 8;

FIG. 10 is a fragmentary view in perspective further illustrating the method of fabric covering shown in FIG. 8;

FIG. 11 is a fragmentary view in perspective showing the preferred method of fabric covering;

FIG. 12 is a top view showing a modification of the invention for installation on wider windows;

FIG. 13 is a top view showing yet another modification of the invention for installation on still wider windows;

FIG. 14 is a fragmentary cross-sectional view showing a detail of the construction of FIGS. 12 and 13;

FIG. 15 is a fragmentary exploded view further illustrating the detail of FIG. 14;

FIG. 16 is a fragmentary top view illustrating another adaptation of the cornice frame construction of the invention for angle installations, such as bay windows;

FIG. 17 is a rear view of the construction of FIG. 16;

FIG. 18 is a fragmentary exploded view further illustrating the construction of FIGS. 16 and 17;

FIG. 19 is a front view of a cornice frame construction in accordance with the invention and having a scalloped bottom edge;

FIG. 20 is an exploded rear view of the cornice frame construction of FIG. 19;

FIG. 21 is a fragmentary rear view further illustrating the installation of a fabric covering on the cornice frame construction of FIGS. 19 and 20;

FIG. 22 is a fragmentary cross-sectional view showing a pleat-forming member for use with the cornice frame construction of the invention;

FIG. 23 is a perspective view showing the cornice frame construction of the invention installed on a corner window;

FIG. 24 is a top view, partly broken away, further illustrating the corner window installation of FIG. 23; and FIG. 25 is a fragmentary exploded view further illustrating the construction of FIG. 24.

Referring now to FIGS 1 through 7 of the drawings, the basic "building block" of my prefabricated cornice frame assembly is a corner unit 30. Corner unit 30 is formed of a unitary, generally rectangular, initially flat sheet of relatively thin metal, such as aluminum, divided along a transverse line 32 into front and end panels 34, 36. The front and end panels 34 and 36 respectively have front and rear surfaces 38, 40 and top and bottom edges 42, 43.

The basic corner unit is adapted to be packaged and shipped in its flat condition, as shown in FIGS. 6 and 7, i.e., prior to bending to form a corner, as will now be described. In order to assemble the basic corner unit, the sheet 30 is bent or formed along the transverse line 32 so that the front and end panels 34, 36 are disposed in angular relationship, which would generally be a right angle, so that the front surfaces 38 of the front and end panels 34, 36 define an exterior corner and the rear surfaces 40 define an interior corner. The rear surface 40 of the sheet 30 may be scored along the transverse line 32 in order to facilitate bending.

In order to secure the front and end panels 34, 36 in their corner-defining relationship, as best seen in FIGS. 2, 4 and 6, members 44, 46 are respectively secured to the rear surface 40 of the front and end panels 34, 36, for example, by riveting as at 48, the members 44, 46 respectively having flange portions 50, 52 formed thereon, as shown. When the sheet 30 is bent, as above described, so that the front and end panels 34, 36 form the right angle corner, flange portions 50, 52 engage in overlapping relationship as best seen in FIGS. 2 and 4. Flange portions 50, 52 respectively have apertures 54, 56 formed therein which are respectively in alignment when the corner is formed, apertures 54, 56 accommodating suitable threaded fasteners 58 which secure the flange portions 50, 52 together and thus serve to secure the front and end panels 34, 36 in their assembled right angle corner relationship.

Members 44 and 46 respectively have two elongated flange portions 200, 50 and 202, 52 joined at a longitudinally extending fold 204. Flange portions 200 and 202 each have an elongated straight edge 206. Flange portions 200 and 202 are secured as above-mentioned to an initially flat sheet 30 of relatively thin material with the edges 206 extending transversely of the sheet on either side of the line 32 in spaced facing relation. The edges 206 define a bendable portion of the sheet 30 and function to support the sheet while the sheet 30 between the edges 206 is being bent about the line 32.

The portions 50 and 52 of the members 44 and 46 are respectively disposed over the portions 200 and 202. When the sheet 30 is bent about line 32, the flange portions 50 and 52 are positioned in overlapping relationship as above-mentioned and shown in FIGS. 2 and 4. In this position the members 44 and 46 form a corner strengthening member which extends longitudinally of the line 32 along which sheet 30 is folded.

Thus it is seen that the basic corner unit of the invention may be shipped flat and that after removal from the shipping package, the corner is simply and easily formed by merely bending the end panel with reference to the front panel to form the corner with the threaded fasteners then being inserted in the apertures in the coooperating flange portions to secure the front and end panels in their right angle corner relationship.

Rearwardly extending flange portions 60, 62 are respectively formed at the top and bottom edges 42, 43 of the front and end panels 34, 36, the bottom flange portion 62 preferably having an upwardly inclined section 64 and a vertical section 66 for appearance reasons only. The top and bottom flange portions 60, 62 of the front and end panels 34, 36 terminate in mitered ends 68, 70 which, when the right angle corner is formed, are spaced apart to define top and bottom slots 72, 74. As will hereinafter be more fully described, slots 72, 74 are used to accommodate the surplus fabric which is used to cover the front surfaces 38 and the top and bottom flange portions 60, 62 of the front and end panels 34, 36, the surplus fabric at the corners being "poked" into the slots 72, 74, respectively. This construction also permits pulling the fabric tightly around the top and bottom exterior corners 73.

It will now be seen that a basic right-hand corner unit and a basic left-hand corner unit may be provided, one of the units being dimensioned slightly larger than the other, so that the respective front panels 34 and their top and bottom flanges 60, 62 will telescope one within the other, as shown in FIGS. 2 and 3, thereby permitting adjustments of a basic cornice frame assembly to fit a relatively wide range of window widths. In order to secure the right and left-hand basic corner units together, suitable mating apertures 76 are provided in the respective front panels 34 with suitable fastening members 78 being inserted therein when the proper adjustment has been provided.

In order to mount the cornice frame assembly thus far described upon a wall 80, bracket members 82 are secured to the rear surfaces 40 of the front panels 34 in any suitable manner as by rivets 84. Rearwardly extending members 86 are secured to bracket members 82 by means of suitable threaded fasteners 88, a range of upward and downward adjustment of members 86 with respect to brackets 82 being provided by means of apertures 90, as best seen in FIG. 5. Forwardly extending bracket members 92 are provided having flange portions 94 adapted to be secured to the wall 80 in any suitable manner, as by screws 96. Bracket members 92 are adjustably secured to members 86 by means of suitable threaded fasteners 98 which extend through suitable slots 100 in the members 86 thereby permitting a range of forward and rearward adjustment of the cornice frame assemblies with reference to wall 80. Conventional hangers 102 for supporting drapery rods (not shown) which in turn suspend draperies 104 are provided as best seen in FIGS. 2 and 5. In order to present a smooth appearance at the point where the side edge 106 of the end panel 36 touches or is adjacent wall 80, and inturned flange 108 is formed, as best seen in FIGS. 2 and 4. It will readily be seen that the bracket members 82 may be mounted on the end panels 36 rather than on the front panels 34. It will also be seen that my cornice frame assembly can be mounted or hung from the top flange 60.

Referring now to FIGS. 8 through 11, the cornice frame assembly thus far described may readily be covered with a pre-cut piece 110 of desired fabric. In the embodiment shown in FIGS. 8 and 10, the fabric 110 covers the front surfaces 38 of the front and end panels 34, 36, the top and bottom flanges 60, 62, and is folded over the top and bottom flanges, being removably retained thereon by means of suitable spring clips 112. It will immediately be observed that a surplus of fabric will be formed at the corners where the front and end panels 34, 36 join, and this surplus is merely "pushed" downwardly and upwardly into the slots 72, 74, respectively, so that the top and bottom flanges 60, 62 and the top and bottom corners 73 are smoothly covered with no wrinkles or bulges in the fabric. It will also be seen that the fabric may be brought around the rear flange 108.

Referring to FIG. 11, in the preferred embodiment of the invention, the top and bottom extremities 111, 113 of the fabric layer 110 are carried downwardly and upwardly over the top and bottom flanges 60, 62 so as partially to overlay the rear surface 40 of the front and end panels 34, 36. These top and bottom extremities 111, 113 are then resiliently held together thereby tautly to retain the fabric layer 110 on the respective front and side panel by means of suitable resilient ties which comprise suitable clips 117 connected by an elastic element 119.

In case the overall length of the unit, i.e., the length of the front and end panels exceeds the width of the available material, two pieces of material may be employed with their side edges being abutting, adjacent, or overlapping at the center of the front panel of the unit, this joint or seam in the fabric being concealed by a plate member 114 secured to the front surface 38 of the front panel 34 by means of suitable fasteners 116 extending through appropriate apertures 76, and the plate member 114 may itself be covered with the same or a contrasting fabric. A pad 115 of suitable material such as felt, may underlie the fabric 110 in order further to improve the appearance of a finished unit. This pad may be retained on the front surfaces of the front and end panels by means of suitable fasteners 118 extending through the apertures 76, as best seen in FIG. 4, or alternatively by suitable adhesive or adhesive tape.

It will be seen that a considerable range of axial adjustment in the overall length of the unit is possible by means of a telescoping arrangement of the front panels as shown in FIGS. 2, 3, 4, and 6. It will also be readily understood that a unit of fixed length may be provided with the two end panels 36 unitarily jointed to a single front panel 34 in the manner above described. However, in order to provide cornice frame assemblies for windows of greater length, the arrangement shown in FIGS. 12 through 15 is provided. Referring first to FIG. 14, a pair of right-hand and left-hand cornice frame units 120, 122 is provided fabricated as previously described. The side edges 124, 126 of the front panels 34 of each of these units, i.e., the side edges remote from the end panels 36, have inturned flange portions 128, 130 respectively formed thereon. An adjacent pair of these flange portions 128, 130 is engaged by clip members 132, clamp members 134 engage the front surfaces 38 of the adjacent front panels 34, and plate member 136 completes the assembly with suitable threaded fasteners 138 extending through respective apertures 140 and 142 in the plate member 136 in clamp members 134 and threadingly engaging apertures in the clamp members 132, as shown. Here, the felt pads 115 which cover the front surfaces 38 of the front panel 34 of the adjacent units 120, 122 will extend nearly to the side edges 124, 126 as will the fabric covering 110 and the plate member 136 is then desirably also covered with the fabric. Alternatively, the threaded fasteners 138 may engage the clamps 134 as shown in FIG. 14 and the plate members 136 exteriorly covered with the fabric layer 110a as suggested in FIG. 14. In this event, a tab 143 is desirably provided at the top edge of the plate member 136 for properly locating the plate member. As a further alternative, the plate member 136 may be initially covered with fabric and then retained in position covering and concealing the joint between the front panels 34 of the two units 120, 122 by resilient ties of the type shown in FIG. 11, or by clips as shown in FIG. 10.

Referring now to FIG. 13, still longer units may be assembled by providing one or more intermediate front panels 144 each of which has rearwardly extending inturned flange portions 128, 130, formed on its side edges and with the resultant joints between the intermediate panel 144 and the right and left-hand units 120, 122 being covered and concealed in the same fashion as that described above in connection with FIGS. 12, 14 and 15.

Referring now to FIGS. 16, 17 and 18, it may be desirable to position two units 146, 148 at an obtuse angle with respect to each other, for example in assembling a cornice frame assembly for a bay window. Thus, unit 146 may be an intermediate-type unit such as unit 144 shown in FIG. 13, i.e., a unit having only a front panel and no end panels, whereas unit 148 may be a basic unit having both front and end panels as above described. Here, the side edges 124, 126 of the front panels 34 of the units 146, 148 again have inturned rearwardly extending flange portions 128, 130 formed thereon and the two units are held in assembled relation and the joint concealed in a manner siimlar to that shown in FIGS. 12 through 15. More particularly, a rear clamp 150 is provided which engages the flange portions 128, 130 and front clamps 152 are provided which engage the front surfaces 38 of the front panels 34, the front and rear clamps 152, 150 being held in assembled relation by means of suitable threaded fasteners 154 extending through apertures 156, 158 in the clamps 152, 150 as best seen in FIG. 18. A plate member 160 is again provided to conceal the resultant joint and may be removably attached, without removing the clamp members 150, 152 by suitable fasteners 162 which extend through other apertures 164, 166 in the clamp members 152, 150. Fasteners 162 may extend through the plate member 160 or may be welded to the rear surface thereof so that a smooth uninterrupted front surface is provided on the plate member 160. Plate 160 may be covered if desired as shown in FIG. 14.

It will be readily understood that this construction may be employed in connection with embodiments of FIGS. 12 through 15 rather than that shown.

Referring now to FIGS. 19, 20, and 21, it may be desirable to provide a cornice frame assembly having a scalloped bottom edge 163. Here, the bottom edge 165 of the front and end panels 34, 36 is scalloped or undulated, as shown, and in this embodiment in which the bottom flange 62 is eliminated, it may be desirable to provide a stiffening flange 167 secured to the rear surface 40, as shown. Here, in order to compensate for the surplus material in the fabric layer 110 produced by the scalloped bottom edge 165, a member 168 is provided having rearwardly extending undulations or projections 170 intermediate fastening portions 172. Member 168 is secured to the rear surface 40 by means of suitable fasteners 174 which extend through apertures 176 in the fastening portions 172. It will be seen that the surplus material if provided in the regions of the upwardly extending portions of the scalloped bottom edge 164 and thus the undulations 170 of the member 168 are disposed in alignment with these upwardly extending scallops, i.e., the mounting portions 172 and pins 174 are in alignment with the downwardly extending scallops. Reference to FIG. 21 will now reveal that by reason of the provision of the undulated member 168 on the rear surface 40 of the front panel 34, the material of the fabric covering 110 which otherwise would be rendered surplus by reason of the scalloped bottom edge 165 is accommodated so that the fabric layer 110 is tautly retained and presents a smooth front and bottom surface without unsightly wrinkles or loose portions.

Referring now to FIG. 22, it may be desirable from an appearance standpoint to provide pleats in the fabric covering 110. In order to accomplish this, plate members 178 may be provided having a flange 180 formed at one edge, plate members 178 being removably secured to the front panel 34 by means of suitable fasteners 182 extending through the apertures 76. With this arrangement, a fold 184 of the fabric covering 110 is merely inserted under the flange 180 of the plate member 178 and the plate member is then secured to the front panel 34 by the fastener 182, as shown, with the fabric covering 110 then extending over the plate member 178, as at 186.

Referring now to FIGS. 23, 24 and 25, it may be desirable to install a cornice frame assembly in accordance with the invention on a corner window. Here, two basic left and right-hand units 120, 122 are employed respectively having inturned rearwardly extending flange portions 128, 130 formed on their side edges. The two units 120, 122 are installed as above-described on the right angle walls 188, 190 so that their side edges 124, 126 are closely adjacent, as shown. A clamping bracket 192 is then provided having a hook portion 194 engaging flange portion 130 and having at its other end a mounting portion 196 secured to the respective mounting bracket member 86 by means of a suitable threaded fastener 198, as shown.

While the cornice frame assembly of the invention has been described as being fabricated from relatively thin metal, it will be understood that it may also be formed of suitable thin self-supporting plastic material.

It will be readily understood that in order to provide various decorative appearances, plate members may be provided in various shapes, such as square, rectangular, diamond, etc., that these plate members may then be covered with desired material and attached to the front surface of the cornice frame by means of suitable fasteners "poked" through the fabric covering 110 and through a respective aperture 76. While the cornice frame constructon of the invention has been described above in connection with the use of fabric coverings, it will readily be understood that it can also be painted in any desired color, or can be prefinished with a suitable baked enamel finish.

It will now be seen that there is provided in accordance with the invention a simple, readily adjustable cornice frame construction prefabricated with attached end panels, the units being capable of packaging and shipment in knocked-down, i.e., flat condition, but readily assembled and installed, the only tool required being a screwdriver. It will further be seen that the cornice frame of the invention may be readily covered with any desired material, which can thereafter be removed for cleaning or replacement, covering of the cornice frame being well within the capability of any housewife. It will be seen that when so covered with fabric, all visible surfaces are covered, i.e., not only the front surfaces of the front and end panels, but also the top and bottom edges and any desired amount of the back surface (see FIG. 11). It will further be seen that a minimum number of accessory parts permit adaptation of the basic units for use with wide windows, corner windows, bay window installations and the like. It is also seen that other simple additions to the basic cornice frame construction permit the use of scalloped bottoms, various forms of pleated coverings, and other decorative effects.

While I have described above the principles of this invention in connection with specific apparatus, it is to be clearly understood that this description is made only by way of example and not as a limitation to the scope of the invention.

What is claimed is:

1. A cornice frame comprising: a generally rectangular front panel having front and rear surfaces, top and bottom edges, and a side edge; a generally rectangular end panel having front and rear surface, top and bottom edges, and a side edge; said front and end panels being integrally joined along said side edges and forming a right angle whereby said front surfaces define an exterior corner; each of said panels having a member secured to its rear surface adjacent its side edge, said members respectively having first flange portions, said first flange portions respectively engaging in overlapping relationship; fastener means securing said first flange portions together; each of said panels having top and bottom rearwardly extending flange portions respectively formed on said top and bottom edges; a first bracket secured to said rear surface of one of said panels and having a rearwardly extending portion; a second bracket member having means for securing the same to a wall and having a forwardly extending portion; and means for adjustably securing said first and second bracket member extension portions together thereby adjustably to support said frame on said wall.

2. The combination of claim 1 further comprising a layer of fabric covering said front surfaces and said flange portions of said panels, and wherein said top and bottom flange portions of said front and end panels respectively have mitered ends adjacent said side edges, said mitered ends being respectively spaced apart to define top and bottom slots for accommodating surplus fabric.

3. A cornice frame comprising: a unitary initially flat sheet of relatively thin self-supporting material divided along a transverse line into front and end panels respectively having front and rear surfaces and top and bottom edges, said sheet being adapted to be bent along said line so that said panels are disposed in angular relationship with said front surfaces defining an exterior corner, means for securing said panels in said angular relationship; said bottom edge of said front panel being scalloped; and means on said rear surface of said front panel for accommodating fabric with which said front panel is covered which is rendered surplus by said scalloped bottom edge whereby said fabric smoothly covers said front surface of said front panel and conforms to said scalloped edge.

4. The combination of claim 3 wherein said scalloped bottom edge has both crests and valleys, and said accommodating means comprises a member adjacent said scalloped bottom edge having rearwardly extending undulations therein respectively in registry with the valleys of the scallops in said bottom edge.

5. In a cornice frame, a front panel formed of a flat sheet of relatively thin self-supporting material having front and rear surfaces and top and bottom edges, said bottom edge being scalloped, said scalloped bottom edge having both crests and valleys, and a member on said rear surface adjacent said bottom edge and having rearwardly extending undulations therein respectively in registry with the valleys of the scallops in said bottom edge for accommodating fabric with which said front surface of said panel is covered which is rendered surplus by said scalloped bottom edge whereby said fabric smoothly covers said front surface and conforms to said scalloped edge.

6. A cornice frame comprising an elongated flat sheet and two strengthening members, each of said members having an elongated and substantially straight bending edge, said members secured to said sheet between the longitudinal boundaries thereof with said bending edges of said members extending transversely of said sheet in spaced apart and facing relation, thereby defining a bendable portion of said sheet between said edges, said sheet having longitudinally extending peripheral flange portions secured thereto at said boundaries thereof, said members being secured to said sheet between said flange portions, each of said flange portions having a slot therein in registry with said bendable portion of said sheet, thereby adapting said sheet to be folded transversely of said sheet along a line within said bendable portion to form front and end panel portions disposed in angular relation with a corner therebetween, said corner being generally at said line, and means for securing said front and end panel portions in said angular relation.

7. The cornice frame of claim 6 wherein said means comprises said members being angle members having two elongated portions joined at a longitudinally extending fold, one of said portions of each of said members being secured to said sheet and having said edge thereon, the other of said portions of each of said members being disposed over said one portion, said other member portions being adjacent to each other when said sheet is in said angular relation thereby forming a corner strengthening member out of said angle members, and means for fastening said other member portions in the last-mentioned adjacent relation, said corner member extending longitudinally of said line along which said sheet may be folded, said corner member having said one portion of said angle members disposed at an angle with said bending edges adjacent to each other, the apex of said angle between said one portion being generally at said line.

8. The cornice frame of claim 6 wherein said flange portions extend away from a front surface of said sheet and define top and bottom, oppositely facing edges further comprising a layer of fabric covering said front surface and said edges; and wherein said slots in said flange portions are defined by facing edges which remain spaced apart when said sheet is in said angular relation thereby to accommodate surplus material adjacent to said corner.

9. The cornice frame of claim 6 further comprising bracket means secured to said sheet for mounting said sheet onto a wall in a covering relation to drapery rods, said bracket means supporting said sheet independently of said drapery rod whereby said sheet is free-standing.

10. The cornice frame of claim 9 further comprising a second enlongated flat sheet, each of said sheets having an end and means secured to one of said sheets for securing said sheets together in end to end relation.

11. A cornice frame comprising a sheet having front and rear surfaces and top and bottom edges, said bottom edge of said sheet having a plurality of alternating crests and valleys therein, a member secured to said rear surface of said sheet having portions extending outwardly from said rear surface, a layer of fabric covering said front surface and top and bottom edges of said sheet, a peripheral portion of said fabric layer covering said member, the fabrics rendered surplus by the valleys of said bottom sheet edge being taken up by said member portions whereby said fabric smoothly covers and conforms to said front surface and top and bottom edges.

References Cited
UNITED STATES PATENTS

| | | | |
|---|---|---|---|
| 2,565,588 | 8/1951 | Bruno | 160—38 |
| 2,594,656 | 4/1952 | Junkunc | 160—38 |
| 2,824,606 | 2/1958 | Lorntzen | 160—38 |
| 2,998,062 | 8/1961 | Bixby | 160—38 |
| 2,862,549 | 12/1958 | Robins | 160—38 |

FOREIGN PATENTS

| | | |
|---|---|---|
| 23,368 | 1908 | Great Britain. |
| 707,728 | 4/1954 | Great Britain. |
| 795,147 | 5/1958 | Great Britain. |
| 849,517 | 9/1960 | Great Britain. |

DAVID J. WILLIAMOWSKY, *Primary Examiner.*

HARRISON R. MOSELEY, *Examiner.*

J. K. BELL, *Assistant Examiner.*